(12) United States Patent
Xu et al.

(10) Patent No.: US 10,795,052 B2
(45) Date of Patent: Oct. 6, 2020

(54) TOPOGRAPHY-METER HOST BASED ON INTEGRATIVE MAINBOARDS

(71) Applicant: Dalian University of Technology, Dalian (CN)

(72) Inventors: Xiangzhou Xu, Dalian (CN); Lu Gao, Dalian (CN); Xingyang Zhao, Dalian (CN); Junwen Yin, Dalian (CN); Jiyuan Lu, Dalian (CN)

(73) Assignee: DALIAN UNIVERSITY OF TECHNOLOGY, Dalian, Liaoning Province (CN)

( * ) Notice: Subject to any disclaimer, the term of this patent is extended or adjusted under 35 U.S.C. 154(b) by 0 days.

(21) Appl. No.: 16/499,707

(22) PCT Filed: Oct. 12, 2018

(86) PCT No.: PCT/CN2018/110020
§ 371 (c)(1),
(2) Date: Sep. 30, 2019

(87) PCT Pub. No.: WO2020/073309
PCT Pub. Date: Apr. 16, 2020

(65) Prior Publication Data
US 2020/0150308 A1    May 14, 2020

(51) Int. Cl.
*H01S 3/08* (2006.01)
*G01V 8/20* (2006.01)

(52) U.S. Cl.
CPC ..................... *G01V 8/20* (2013.01)

(58) Field of Classification Search
CPC ...... H04J 14/02; H04J 14/0215; H01J 14/021; G02B 6/4296; G02B 6/44; G02B 7/008; G02B 26/00; G02B 27/00; G02B 30/00
See application file for complete search history.

(56) References Cited

FOREIGN PATENT DOCUMENTS

| CN | 201561754 U | 8/2010 |
| CN | 102088157 A * | 6/2011 |

(Continued)

*Primary Examiner* — Don K Wong
(74) *Attorney, Agent, or Firm* — Muncy, Geissler, Olds & Lowe, P.C.

(57) ABSTRACT

The invention belongs to the field studying the devices for soil and water conservation. The invention involves a topography-meter host based on integrative mainboards, which dynamically observe the landform in real-time and three-dimensions. The linear laser sources are accurately positioned with Ohm-shaped clamps, so as to emit parallel and equidistant laser-planes projecting onto a terrain in an experiment. The positions of the laser-sources on the mainboards are fixed with the Ohm-shaped clamps. The clamps do not only realize the convenient adjustment of the emission angle and spacing distance of the adjacent laser-sources, but also ensure a high accuracy of the positions and angles of the laser-sources even if the topography-meter host is moved. Several multi-segmented cases are freely spliced to observe the landforms with different heights in real-time. The invention is a novel topography-meter host which conveniently and accurately fixes the spacing distances and emission angles of the laser-sources, and the invention also satisfies the requirement in observing the landforms with different heights.

1 Claim, 5 Drawing Sheets

(56) References Cited

FOREIGN PATENT DOCUMENTS

| | | |
|---|---|---|
| CN | 103487566 A | 1/2014 |
| CN | 103487567 A | 1/2014 |
| CN | 103487568 A | 1/2014 |
| JP | 2005/010065 A | 1/2005 |

\* cited by examiner

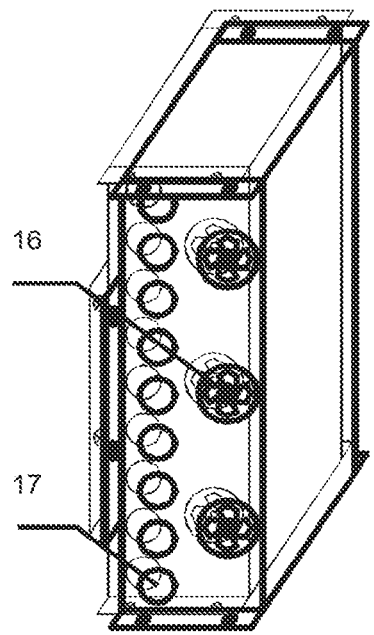
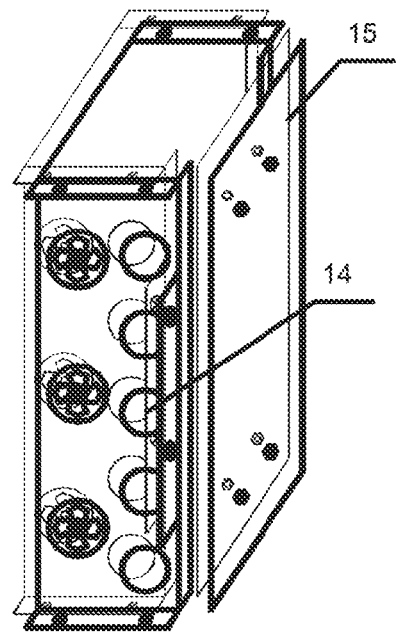
Figure 4(a)  Figure 4(b)
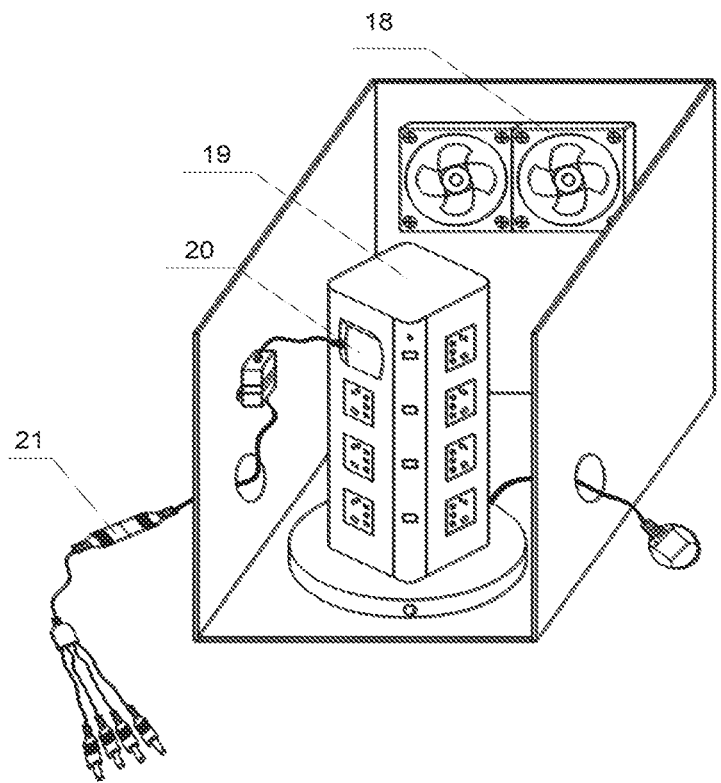
Figure 5

TOPOGRAPHY-METER HOST BASED ON INTEGRATIVE MAINBOARDS

TECHNICAL FIELD

The invention belongs to the field studying the devices for soil and water conservation. The invention involves a topography-meter host based on integrative mainboards, which can dynamically observe the landform in real-time and three-dimension.

BACKGROUND

Due to the complexity of a soil erosion phenomenon, reliable methods are anticipated to observe and analyze the erosional landform to obtain the occurrence mechanism of soil loss. The observation methods of soil erosion in the world can be categorized into two methods: namely the investigation method after the rainfall and dynamic observation method during the rainfall. The for titer is a method to inversely derive the amount of soil erosion via investigating the geomorphic features after rainfalls. In virtue of the non-contact measurement methods and technologies such as the laser scanner, it is possible to monitor the high-risk terrain formed by the gravity erosion in field. However considerable errors may appear as the amount of failure mass is observed after rainfall, for part of the failure mass may be washed away by the flow or the soil inputted from the upper reaches may be deposited in the failure scar during the current rainfall or previous rainfalls. On the other hand, the type and amount of the soil erosion will be determined via the dynamic observation method as the researcher continuously observes the erosion process sand landform shape during the rainfall. The method can monitor the process of soil formation. Nevertheless, to carry out a dynamic observation during the rainfall is so difficult that few related researches are found in the literature. The team of the first inventor of this patent has developed a topography meter based on the structured laser, which could observe the three-dimensional geomorphological landform. The team has successfully developed 5 generations of topography meters since 2009, which realized the quantitative and dynamic observation of the gravity-erosion process on the gully sidewall in a rainfall-simulation experiment. Six China invention patents have been authorized concerning the topography meter, with the numbers of ZL201310422836.6, ZL201310422447.3, ZL201010502055.4, ZL201010502051.6, ZL201010144689.7 and ZL201010144655.8. The topography meter has been used to measure the gravity erosions in the experiments of several projects, for example, the key project of the National Natural Science Foundation of China (no. 5139003) and General Programs of the National Natural Science Foundation of China (no. 51079016 and no. 51179021). The observed results are all acceptable.

However, the above-mentioned topography meter still has the following disadvantages: (1) The positions and angles of the linear laser sources in the host may be changed if a topography-meter host is moved. As a result, considerable errors may be generated as the host emits the equidistant and parallel laser-planes. Hence the host should be repositioned and used in a new experiment only after the positions and angles of the linear laser sources in the host have been calibrated. Nevertheless, calibration of the topography meter is complicated and time consuming. (2) The topography meter could not observe the landform beyond the scope of the meter. Consequently the topography-meter host with the fixed height cannot meet the demand of measurement for the landforms with various scales. To solve the problems above mentioned, the invention designs a topography-meter host with the integrative mainboards that utilize the Ohm-shaped clamps to accurately position the linear laser sources. The new topography meter can attain a high accuracy even if the topography-meter host has been moved to another site. Moreover, the invention designs a multi-segmented host to adapt the change of the heights of the experimental landforms. A real-time observation is possible even if the ranges of the monitored objects are greatly varied.

SUMMARY

The invention of a novel topography-meter host solves previously described technical problems, which can conveniently and accurately fix the spacing and the angle of the linear laser-sources, and satisfy the requirement of the observations with different ranges.

The technical solutions of the invention are shown as follows:

A topography-meter host based on the integrative mainboards comprises the integrative mainboards 2, a multi-segmented-host case 3 and a low-voltage power box 1. The topography meter can emit parallel and equidistant laser-planes to be projected onto a terrain requiring observation in an experiment.

The integrative mainboards 2 mainly consist of the Ohm-shaped clamps 7, linear laser sources 6, a metal bottom plate 5 and channel steel 8; a plurality of Ohm-shaped clamps 7 are arranged; the linear laser sources 6 are fixed into a notch protruded from the Ohm-shaped clamps 7; the screw holes are arranged at the edges of both ends of the Ohm-shaped clamps 7; a plurality of fixing holes are evenly distributed on the metal bottom plate 5; the screw holes on the Ohm-shaped clamps 7 correspond to the fixing holes on the metal bottom plate 5; a plurality of groups of Ohm-shaped clamps 7 and linear laser sources 6 are fixed to the metal bottom plate 5 at equal distances under the cooperation of the bolts, screw holes and fixing holes; the center spacing of the adjacent Ohm-shaped clamps 7 is same to the spacing of the laser-planes emitted by the linear laser sources 6; the diameter of the screw holes of the Ohm-shaped clamps 7 is greater than the diameter of the fixing holes on the metal bottom plate 5; the bolts are adjusted to realize micro-adjustment of the linear laser sources 6 in the fixing positions on the integrative mainboards 2; the metal bottom plate 5 is uniformly provided with a plurality of mounting holes; the metal bottom plate 5 is fixed on the channel steel 8 through the cooperation of the mounting holes and bolts; the grooves are made on the upper and lower surfaces of the channel steel 8, and the bolts are fixed in the grooves, so as to achieve the purpose that the integrative mainboards 2 are difficult to deform when vertically placed.

The multi-segmented-host case 3 is freely spliced with multi-segmented cases; adjacent cases are fixedly connected into a whole by a horizontal wing plate 11 to adapt to different test heights; the linear laser-source 6 between two adjacent integrative mainboards 2 emits equidistant laser-planes too; a reinforcing cover 10 is placed on the top end of the multi-segmented-host case 3 to provide the safety protection for the integrative mainboards 2 in the multi-segmented-host case 3; a vertical side-wing plate 9 is arranged on a side surface of the case for further fixing the multi-segmented-host case 3 and a pedestal 4; the multi-segmented-host case 3 is mounted on the pedestal 4 through the horizontal wing plate 11 at the bottom; a vertical plate is fixed on the pedestal 4; the vertical plate is fixed to the side-wing plate 9 on the lowermost case of the multi-segmented host 3 into a whole; some pedestal supporting legs 13 are mounted on the bottom of the pedestal 4; a round bubble level 12 is provided on the upper surface of the pedestal 4; a leveling bubble in the round bubble level 12 is centered via adjusting the pedestal supporting legs 13, so that the laser-planes emitted by the integrative mainboards 2 are parallel and equidistant, which is favorable for the calibration, observation and calculation with the topography meter.

Each of the multi-segmented-host cases 3 is a structure with upper and lower openings; one of the side surfaces is a detachable case-side plate 15 to conveniently install the integrative mainboards 2; the integrative mainboards 2 are fixedly mounted on the case-side plate 15 by bolts; the bolts are fixed in the grooves of the channel steel 8; the channel steel 8 is in contact with the case-side plate 15; the integrative mainboards 2 are located inside the case; the wire outlets 14 and equidistant laser-emitting holes 17 are respectively arranged on adjacent side surfaces of the case-side plate 15; the linear laser sources 6 project parallel and equidistant laser-planes through the equidistant laser-emitting holes 17; a single-input multiple-output wire 21 connected with the linear laser sources 6 is penetrated from the wire outlet 14; and a fan 16 is mounted on the case-side surface of the wire outlet 14 and equidistant laser-emitting holes 17, and the fan is used for heat dissipation.

The low-voltage power box 1 mainly consists of a vertical porous panel 19, the single-input multiple-output wires 21, power adapters 20 and a ventilation and heat-dissipation device 18; the single-input multiple-output wire 21 connects the power connectors of several linear laser sources 6 with the power adapters 20; the power adapters 20 convert an external power into a weak power of 3-5V for the linear laser sources 6; a plurality of power adapters 20 are plugged into the vertical porous panel 19; the vertical porous panel 19 is connected with a main power supply to provide power for the host; and the ventilation and heat-dissipation device 18 consists of a plurality of fans installed inside the low-voltage power box 1 for ventilation and heat-dissipation.

The benefits of the invention are shown as follows:

1. The emission angle of the linear laser sources and fixing position of the mainboards are realized by clamping the linear laser sources via the micro translations and rotations of the Ohm-shaped clamps. The two adjustments can be conducted simultaneously to make the laser planes emitted by laser modules be parallel and equidistant.

2. A plurality of topography-meter host cases are freely spliced and assembled to satisfy the observation range required by an experiment. As a result, the newly designed topography meter can observe the landforms with various heights.

DESCRIPTION OF DRAWINGS

FIG. 4(a) is the structural schematic diagram a of a multi-segmented-host case;

FIG. 4(b) is the structural schematic diagram b of a multi-segmented-host case;

FIG. 5 is a structural schematic diagram of the low-voltage power box; and

Components shown in the figures: 1 low-voltage power box, 2 integrative mainboard, 3 multi-segmented-host case, 4 pedestal, 5 metal bottom plate, 6 linear laser-source, 7 Ohm-shaped clamp, 8 channel steel, 9 side wing plate, 10 reinforcing cover, 11 horizontal wing plate, 12 round bubble level, 13 pedestal supporting leg, 14 wire outlet, 15 detachable case-side plate, 16 fan, 17 equidistant laser-emitting holes, 18 ventilation and heat radiation device, 19 vertical porous panel, 20 power adapter, and 21 single-input multiple-output wire.

DETAILED DESCRIPTION

The invention will be further illustrated in combination with the case studies and description figures.

Figure 1:
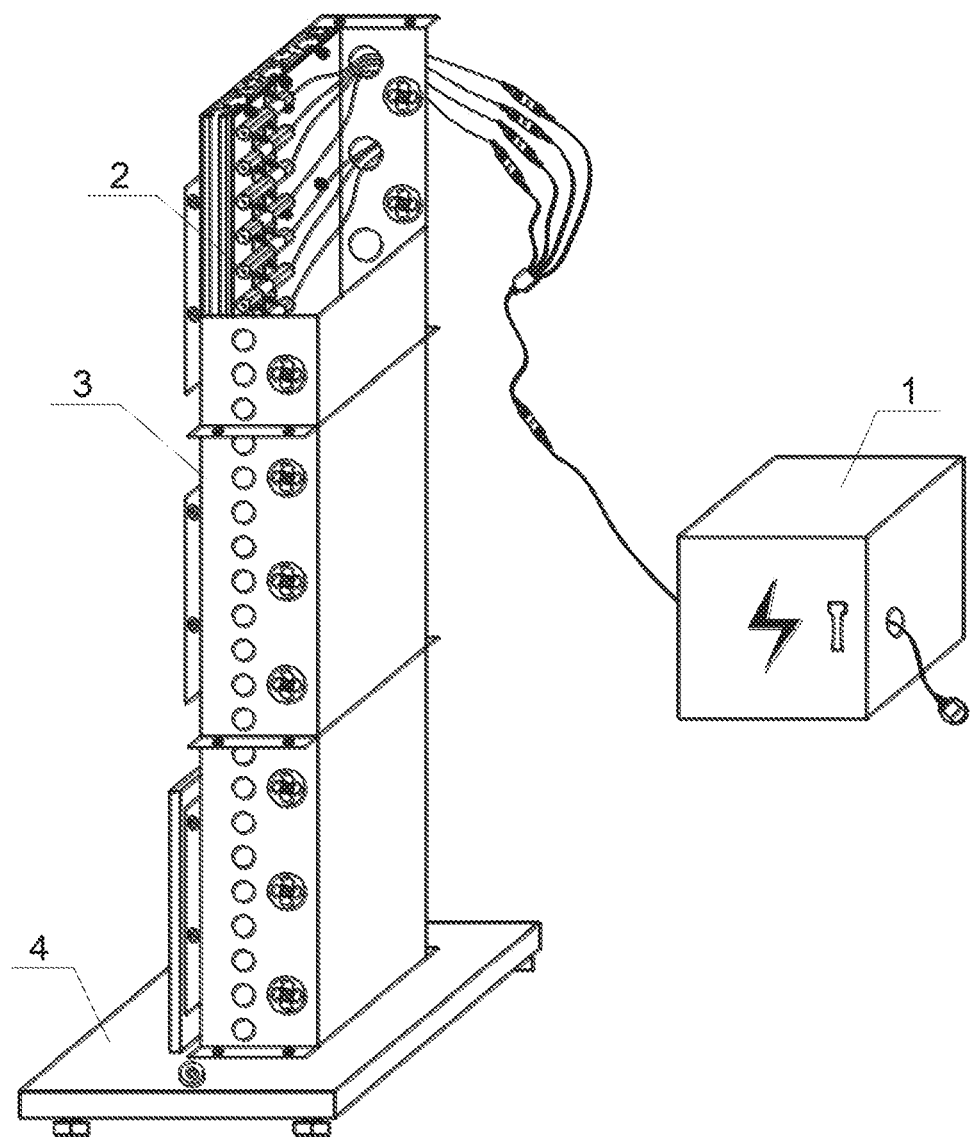
FIG. 1 is a schematic diagram of the topography-meter host based on the integrative mainboards.
Figure 2:
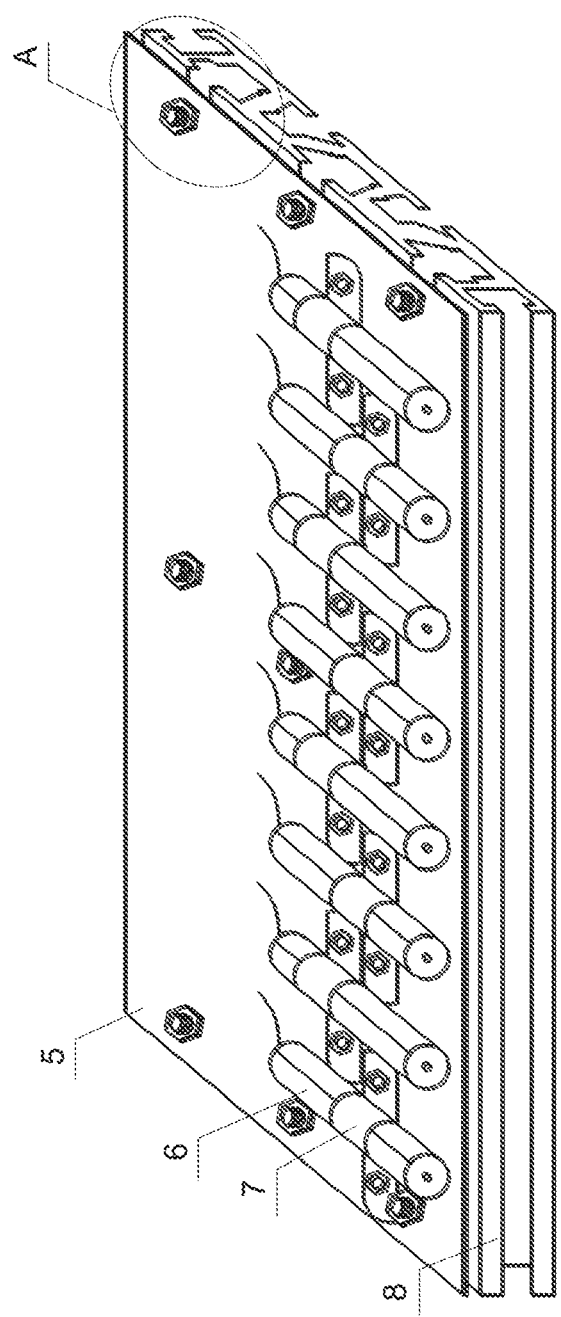
FIG. 2 is a local view of the integrative mainboards.
Figure 3:
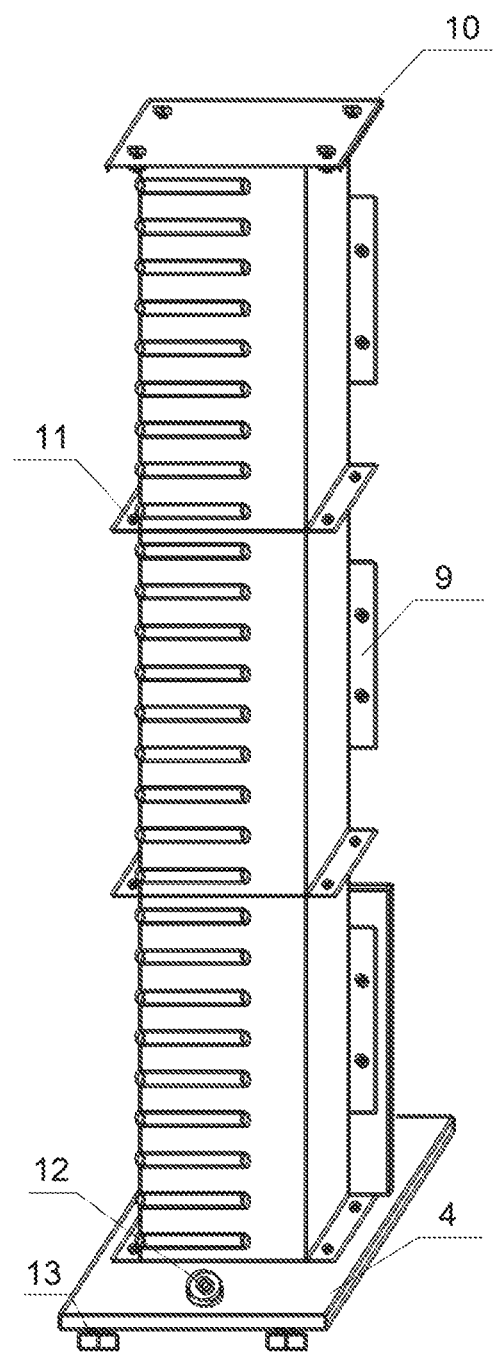
FIG. 3 is a schematic diagram for installation of a multi-segmented-host case.
Figure 6:
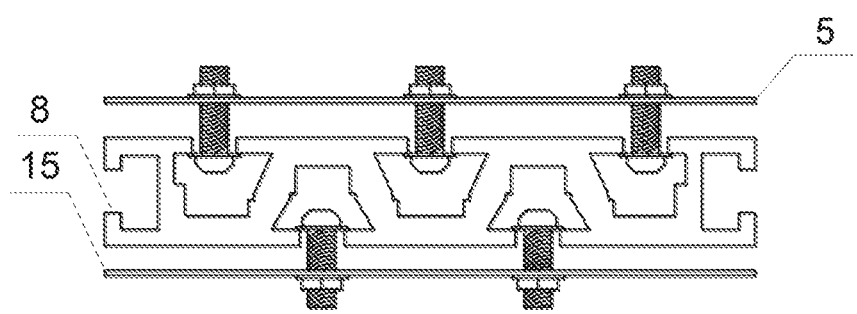
FIG. 6 is an internal view A in the local view 2 of the integrative mainboards.

As shown in FIGS. 1 to 6, a topography-meter host based on the integrative mainboards comprises the integrative mainboards 2, a multi-segmented-host case 3 and a low-voltage power box 1. The installation steps in details are shown as follows:

Step 1: Adjustment and Installation of the Integrative Mainboards 2

The linear laser sources 6 are fixed on a metal bottom plate 5 with the Ohm-shaped clamps 7, which are settled using bolts with rubber gaskets; when the linear laser sources 6 are being installed, the horizontal laser planes emitted by the linear laser sources 6 can be moved up and down through the micro translation or rotation of the Ohm-shaped clamps 7 because the diameter of the screw hole of the Ohm-shaped clamp 7 is a little larger than that of the corresponding fixing hole on the metal bottom plate 5. In virtue of the rubber gasket, the firmness for the linear laser-source 6 can be enhanced with the Ohm-shaped clamp 7 and metal bottom plate 5. The influence on the position and emission angle of the linear laser-source 6 can be also reduced as the integrative mainboards 2 are moving. When the laser planes become parallel and equidistant via the slight adjustment of the linear laser sources 6, the metal bottom plate 5 will be fixed on the channel steel 8 with the bolts. Due to the high stiffness of the channel steel 8, the integrative mainboards 2 are almost impossible to deform when the host is vertically placed. The linear laser sources 6 used in the topography meter own the characteristics of high reliability, strong stability, strong anti-interference performance and long service life. For instance, the diameter of the red linear laser-source is only 16 mm, but its expected service life can reach up to 10000-12000 hours.

Step 2: Installation of the Multi-segmented-host Case 3

The linear laser sources 6 on the integrative mainboards 2 are connected with the single-input multiple-output wire 21. Bolts and grooves on the channel steel 8 are used to fix the integrative mainboards 2 and the multi-segmented-host case 3. The single-input multiple-output wire 21 is penetrated out of the wire outlet 14 at the back side of the multi-segmented-host case 3. According to the height of the landform required by the experiment, several host units will be assembled after the horizontal wing plates 11 on both sides of two adjacent case units are fixedly connected by bolts. Then a reinforcing cover 10 will be placed on the top end of the multi-segmented-host case 3. The side-wing plates 9 and horizontal wing plates 11 at the lower part of the multi-segmented-host case 3 are connected with a pedestal 4 through bolts. A leveling bubble in the round bubble level 12 is accurately centered by adjusting pedestal supporting legs 13 at the bottom of the pedestal 4.

Step 3: Installation of the Topography-meter host and the Low-voltage Power Box 1

The single-input multiple-output wire 21 penetrated out of the wire outlet 14 at the back side of the multi-segmented-host case 3 is connected with power adapters 20 of the linear laser sources 6. A transformer configured for the power adapters 20 is fixed into the low-voltage power box 1, and a plug is inserted onto a vertical porous panel 19. A power line of the vertical porous panel 19 is connected with a main power supply of 220V. A switch of the vertical porous panel 19 is turned on to supply power for the linear laser sources 6 inside the topography meter. Finally a three-dimensional observation device will be carried out in the experiment.

The invention claimed is:

1. A topography-meter host based on integrative mainboards, wherein the topography-meter host based on integrative mainboards comprises some integrative mainboards (2), a multi-segmented host case (3) and a low voltage power box (1), and the host can emit parallel and equidistant laser-planes to be projected onto an terrain which will be observed in an experiment;

an integrative mainboard (2) mainly consists of some Ohm-shaped clamps (7), linear laser sources (6), a metal bottom plate (5) and channel steel (8); a plurality of Ohm-shaped clamps (7) are arranged; the linear laser sources (6) are fixed into the rabbets protruded from the Ohm-shaped clamps (7); screw holes are arranged at the edges of both ends of the Ohm-shaped clamps (7); a plurality of fixing holes are evenly distributed on the metal bottom plate (5); the screw holes on the Ohm-shaped clamps (7) correspond to the fixing holes on the metal bottom plate (5); a plurality of Ohm-shaped clamps (7) and linear laser sources (6) are fixed on the metal bottom plate (5) at an equal distance in virtue of the cooperation of the bolts, screw holes and fixing holes; the center spacing of adjacent Ohm-shaped clamps (7) is equal to the spacing of the laser-planes emitted by the linear laser sources (6); the diameter of the screw holes of the Ohm-shaped clamps (7) is a little greater than the diameter of the fixing holes on the metal bottom plate (5); the bolts are adjusted to realize the micro-adjustment of the linear laser sources (6) in the fixed positions on the integrative mainboards (2); a plurality of mounting holes are drilled on the metal bottom plate (5); a metal bottom plate (5) is fixed on the channel steel (8) through the cooperation of the mounting holes and bolts; the grooves are provided on the upper and lower surfaces of the channel steel (8); the bolts are fixed in the grooves, so as to achieve the purpose that the integrative mainboards (2) are difficult to deform when they are vertically placed;

the multi-segmented host case (3) consists of splicing multi-segmented cases; the adjacent cases are fixedly connected into a whole with a horizontal wing plate (11) to adapt to different heights of the simulated slopes; the linear laser sources (6) on the combined adjacent integrative mainboards (2) emit equidistant laser-planes; the top end of the multi-segmented host case (3) is covered with a reinforcing cover plate (10) to provide the safety protection for the integrative mainboards (2) in the multi-segmented host case (3); a vertical side-wing plate (9) is arranged on a side surface of the case for further fixing the multi-segmented host case (3) and a pedestal (4); the multi-segmented host case (3) is mounted on the pedestal (4) through the horizontal wing plate (11) at the bottom; a vertical plate is fixed on the pedestal (4); the vertical plate is fixed to the side wing plate (9) on the lowermost case of the multi-segmented host case (3) into a whole; the bottom of the pedestal (4) is provided with pedestal-supporting legs (13); the upper surface of the pedestal (4) is provided with a round-bubble level (12); a leveling bubble in the round bubble level (12) is centered by adjusting the pedestal supporting legs (13), so that the parallel and equidistant laser-planes emitted from the integrative mainboards (2) are horizontal, which are favorable for calibrating, observing and calculating with the topography meter;

each section of the multi-segmented host case (3) is a kind of box structure with upper and lower openings; one of the side surfaces is a detachable case-side plate (15) for the convenient installation of the integrative mainboards (2); the integrative mainboards (2) are fixedly mounted on the case side plate (15) by bolts; the bolts are fixed in the grooves of the channel steel (8); the channel steel (8) is contacted with the case side plate (15); the integrative mainboards (2) are located inside the case; a wire outlet (14) and several equidistant laser-emitting holes (17) are independently arranged on adjacent side surfaces of the case-side plate (15); the linear laser sources (6) project parallel and equidistant laser-planes through the equidistant laser-emitting holes (17); a single-input multiple-output wire (21) connected with the linear laser sources (6) is penetrated from the wire outlet (14); a fan (16) is mounted on the case-side surface of the wire outlet (14) and the equidistant laser-emitting holes (17), and is used for heat dissipation;

the low voltage power box (1) mainly consists of a vertical porous panel (19), a ventilation and heat-radiation device (18), and the single-input multiple-output wires (21) and power adapters (20); the single-input multiple-output wires (21) connect the power connectors of the linear laser sources (6) with the power adapters (20); the power adapters (20) convert an external power supply into a weak power supply of 3-5V for supplying power to the linear laser sources (6); a plurality of power adapters (20) are plugged into the vertical porous panel (19); the vertical porous panel (19) is connected with a main power supply to provide power to the host; the ventilation and heat-radiation device (18) consists of a plurality of fans installed inside the low-voltage power box (1) for ventilation and heat-dissipation of the low voltage power box (1).

\* \* \* \* \*